United States Patent [19]
Powers

[11] Patent Number: 6,110,514
[45] Date of Patent: Aug. 29, 2000

[54] EGG DECORATING KIT WITH EGG HOLDING RING

[75] Inventor: Linda M. Powers, Minneapolis, Minn.

[73] Assignee: The Paper Magic Group, Inc., Wilmington, Del.

[21] Appl. No.: 09/032,441

[22] Filed: Feb. 27, 1998

Related U.S. Application Data

[60] Provisional application No. 60/039,557, Feb. 28, 1997.

[51] Int. Cl.$^7$ ........................................... A23B 5/01
[52] U.S. Cl. .......................... 426/300; 426/104; 426/249; 426/250; 426/300; D7/611
[58] Field of Search ................................. 426/104, 250, 426/249, 298, 300; D7/611

[56] References Cited

U.S. PATENT DOCUMENTS

| | | | |
|---|---|---|---|
| D. 33,782 | 12/1900 | Merwarth et al. | D7/611 |
| D. 35,534 | 12/1901 | Conlin | D7/611 |
| D. 325,325 | 4/1992 | Cadman | D7/611 |
| 4,693,205 | 9/1987 | Thill | 118/13 |

*Primary Examiner*—David Lacey
*Assistant Examiner*—Hao Mai
*Attorney, Agent, or Firm*—Charles N. Quinn, Esq.

[57] ABSTRACT

A method for positioning an egg in preparation for decorative dying and painting of the egg exterior includes providing annular disk having circular inner and outer peripheries with circular cross-section beads extending circumferentially continuously around the entirety of the disk of the inner and outer disk extremities, positioning the disk lying flat on a planar surface and positioning the larger radius egg and facing substantially downward in the interior of the disk thereby permitting the egg to rest on the disk in an upright position.

2 Claims, 2 Drawing Sheets

EGG DECORATING KIT WITH EGG HOLDING RING

CROSS HEADING TO RELATED PATENT APPLICATION

This patent application is based on and claims the benefit of the filing date of provisional U.S. patent application Ser. No. 60/039,557, filed Feb. 28, 1997.

The apparatus for the egg coloring kit includes an egg holding ring for supporting an egg in an upright disposition from substantially beneath the egg, with the large radius end of the egg resting in the ring, to provide unencumbered, unfettered access to the egg shell to facilitate decorative dyeing and painting of the egg shell exterior. The egg holding ring includes an annular disk having circular inner and outer peripheries, a circular bead extending circumferentially continuously around the entirety of said disk inner periphery, of diameter exceeding disk thickness and then a circular bead extending circumferentially continuously around the entirety of said disk outer periphery, having common diameter with said disk inner periphery bead.

SUMMARY OF THE INVENTION

This invention in one of its aspects the egg coloring kit of the invention facilitates positioning an egg in preparation for decorative dyeing and painting of the egg exterior. In this aspect the first step is that of providing an annular disk having circular inner and outer peripheries with a circular bead extending circumferentially continuously around the entirety of said disk inner periphery of diameter exceeding disk thickness and a circular bead extending circumferentially continuously around the entirety of the disk outer periphery having common diameter with said disk inner periphery bead. The second step is that of positioning said disk lying flat on a planar surface. The third step is that of positioning preferably the larger radius end facing substantially downwardly in the interior of said disk thereby permitting said egg to rest on said disk in an upright position.

In yet another of its aspects the invention provides a method for decorating an egg in which the first step is that of providing an annular disk having circular inner and outer peripheries with a circular bead extending circumferenitally continuously around the entirety of said disk inner periphery of diameter exceeding disk thickness and a circular bead extending circumferentially continuously around the entirety of the disk outer periphery having common diameter with said disk inner periphery bead. The second step is that of positioning said disk lying flat on a planar surface. The third step is that of preferably positioning the larger radius end facing substantially downwardly in the interior of said disk thereby permitting said egg to rest on said disk in an upright position. The final step is that of applying color in a desired pattern to the exterior of said egg resting on said disk using manual implements.

The result of practice of these methods is illustrated in FIG. 5.

The annular disk for supporting an egg in an upright disposition from substantially beneath the egg to provide unencumbered, unfettered access to the egg shell to facilitate decorative dyeing and painting of the egg shell exterior is illustrated in FIGS. 1 through 4 of the application and also appears in FIG. 5 where it is shown supporting an egg.

DESCRIPTION OF THE DRAWING FIGURES

The drawing, consisting of FIGS. 1 through 5, submitted herewith, shows the egg holding ring for which a design patent is sought.

PRACTICE OF THE INVENTION

Figure 1:
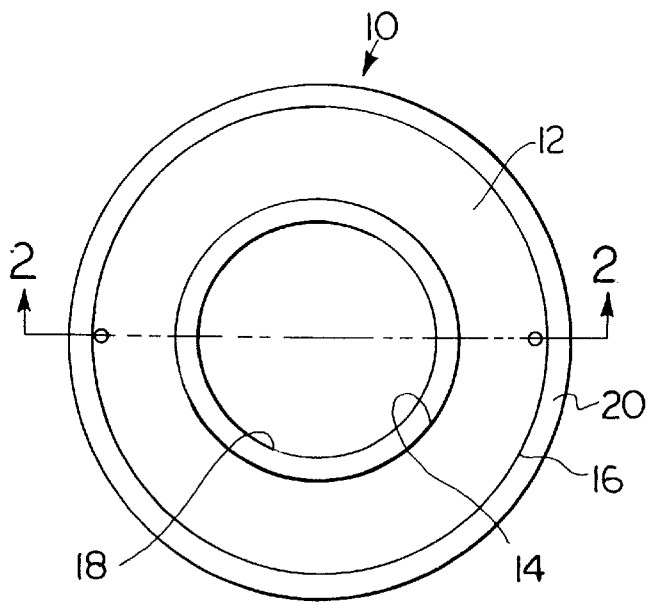
FIG. 1 is a top plan view of the egg holding ring portion of the egg decorating kit embodying my invention.
Figure 3:
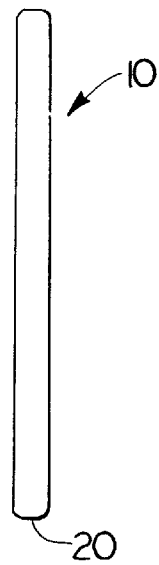
FIG. 3 is a side view of the right side of the egg holding ring portion of the egg decorating kitshown in FIG. 1 and embodying my invention; the left side is a mirror image of the right.
Figure 2:
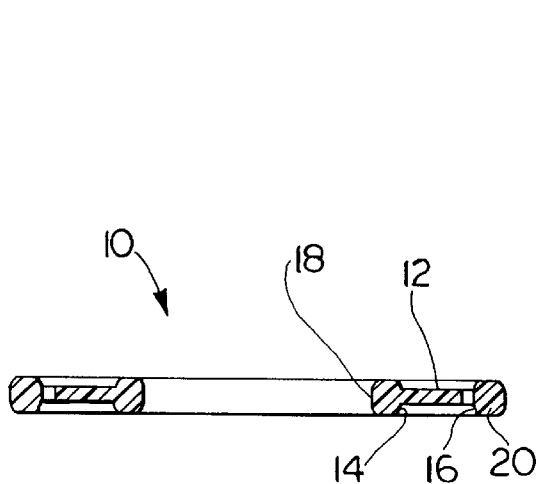
FIG. 2 is a sectional view of the egg holding ring portion of the egg decorating kit embodying my invention as shown in FIG. 1 taken at lines and arrows 2—2 in FIG. 1 and embodying my invention.
Figure 4:
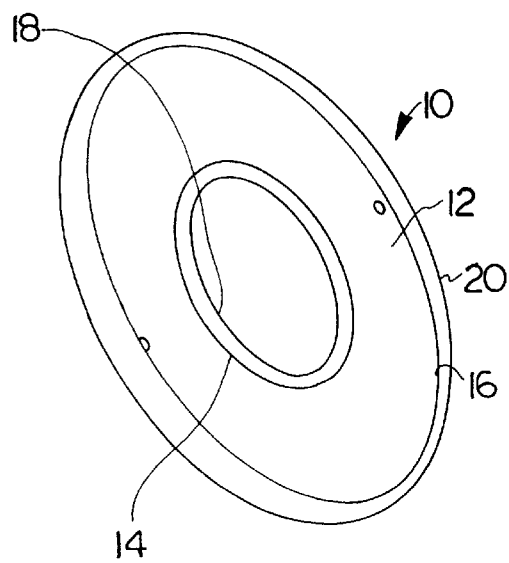
FIG. 4 is a perspective view of the egg holding ring portion of the egg decorating kit illustrated in FIGS. 1, 2 and 3 and embodying my invention.
Figure 5:
FIG. 5 illustrates the egg decorating kit of the invention in use.
Figure 5:
Figure 5:
Figure 5:
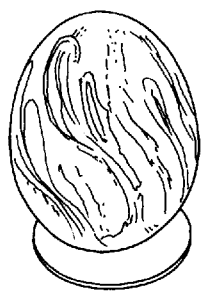
Figure 5:
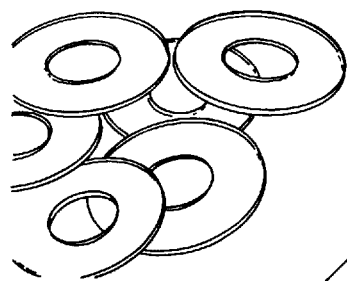

As illustrated in FIG. 5 the kit apparatus includes a ring for supporting an egg in an upright disposition from substantially beneath the egg to provide unencumbered, unfettered access to the egg shell to facilitate decorative dyeing and painting of the egg shell exterior. The ring comprises an annular disk having circular inner and outer peripheries, a circular bead extending circumferentially continuously around the entirety of said disk inner periphery, of diameter exceeding disk thickness and a circular bead extending circumferentially continuously around the entirety of said disk outer periphery, having common diameter with said disk inner periphery bead.

The method for use of the invention is illustrated in FIG. 5 and includes a method for positioning an egg in preparation for decorative dyeing and painting of the egg exterior. The method begins with providing an annular disk having circular inner and outer peripheries with a circular bead extending circumferentially continuously around the entirety of said disk inner periphery of diameter exceeding disk thickness and a circular bead extending circumferentially continuously around the entirety of the disk outer periphery having common diameter with said disk inner periphery bead. The method further includes positioning said disk lying flat on a planar surface. The method yet further includes positioning the preferably larger radius end facing substantially downwardly in the interior of said disk thereby permitting said egg to rest on said disk in an upright position.

The invention further embraces a method for decorating an egg, as illustrated in FIG. 5, which includes as a first step providing an annular disk having circular inner and outer peripheries with a circular bead extending circumferentially continuously around the entirety of said disk inner periphery of diameter exceeding disk thickness and a circular bead extending circumferentially continuously around the entirety of the disk outer periphery having common diameter with said disk inner periphery bead. The method includes as a second step positioning said disk lying flat on a planar surface. In the third step the method includes positioning the preferably but not necessarily the larger radius end facing substantially downwardly in the interior of said disk thereby permitting said egg to rest on said disk in an upright position. The method concludes with the step of applying color in a desired pattern to the exterior of said egg resting on said disk using manual implements.

Referring to FIGS. 1 through 4, the egg holding ring portion of the egg coloring kit is in the form of an annular disk 10 having circular inner and outer peripheries 12, 14.

A circular bead 16 extends circumferentially continuously around the entirety of the inner periphery 12 of disk 10 and has a diameter exceeding disk thickness. A circular bead 18 extends circumferentially continuously around the entirety of the disk outer periphery 14 and has common diameter with the disk inner periphery bead 16.

The kit further includes fabric tipped brush like members 20 for applying color to an egg and at least one tray 22 having receptacles 24 formed therein with grooves to receive the color applicators 20 and to have them rest therein. The receptacles in tray 24 receive color provided as a part of a kit in envelopes, all as illustrated in FIG. 5.

I claim the following:

1. A method of positioning an egg in preparation for decorative dyeing and painting of the egg exterior, comprising:

a. providing an annular disk having circular inner and outer peripheries with circular beads extending circumferentially continuously around the entirety of said disk at inner and outer disk extremities, disk inner-periphery diameter exceeding disk thickness, said circular bead extending circumferentially continuously around the entirety of the disk outer-periphery having common diameter with said disk inner periphery beads said inner and outer beads being separated by a planar disk portion having diameter greater than diameter of interior of said beads, said planar disk portion having thickness in the axial direction less than diameter of either one of said circular beads;

b. positioning said disk lying flat on a planar surface;

c. positioning an egg with a larger radius end facing substantially downwardly in the interior of said disk thereby permitting said egg to rest on said disk in an upright position.

2. A method for decorating an egg, comprising:

a. providing an annular disk having circular inner and outer peripheries with circular beads extending circumferentially continuously around the entirety of said disk at inner and outer disk extremities, disk inner-periphery diameter exceeding disk thickness, said circular bead extending circumferentially continuously around the entirety of the disk outer-periphery having common diameter with said disk inner periphery bead said inner and outer beads being separated by a planar disk portion having thickness in the axial direction less than diameter of either one of said circular beads;

b. positioning said disk lying flat on a planar surface;

c. positioning an egg with a larger radius end facing substantially downwardly in the interior of said disk thereby permitting said egg to rest on said disk in an upright position;

d. applying color in a desired pattern to the exterior of said egg resting on said disk using manual implements.

\* \* \* \* \*